5371X
D. Wooster.
Broom.
Patented Feb. 16, 1829.
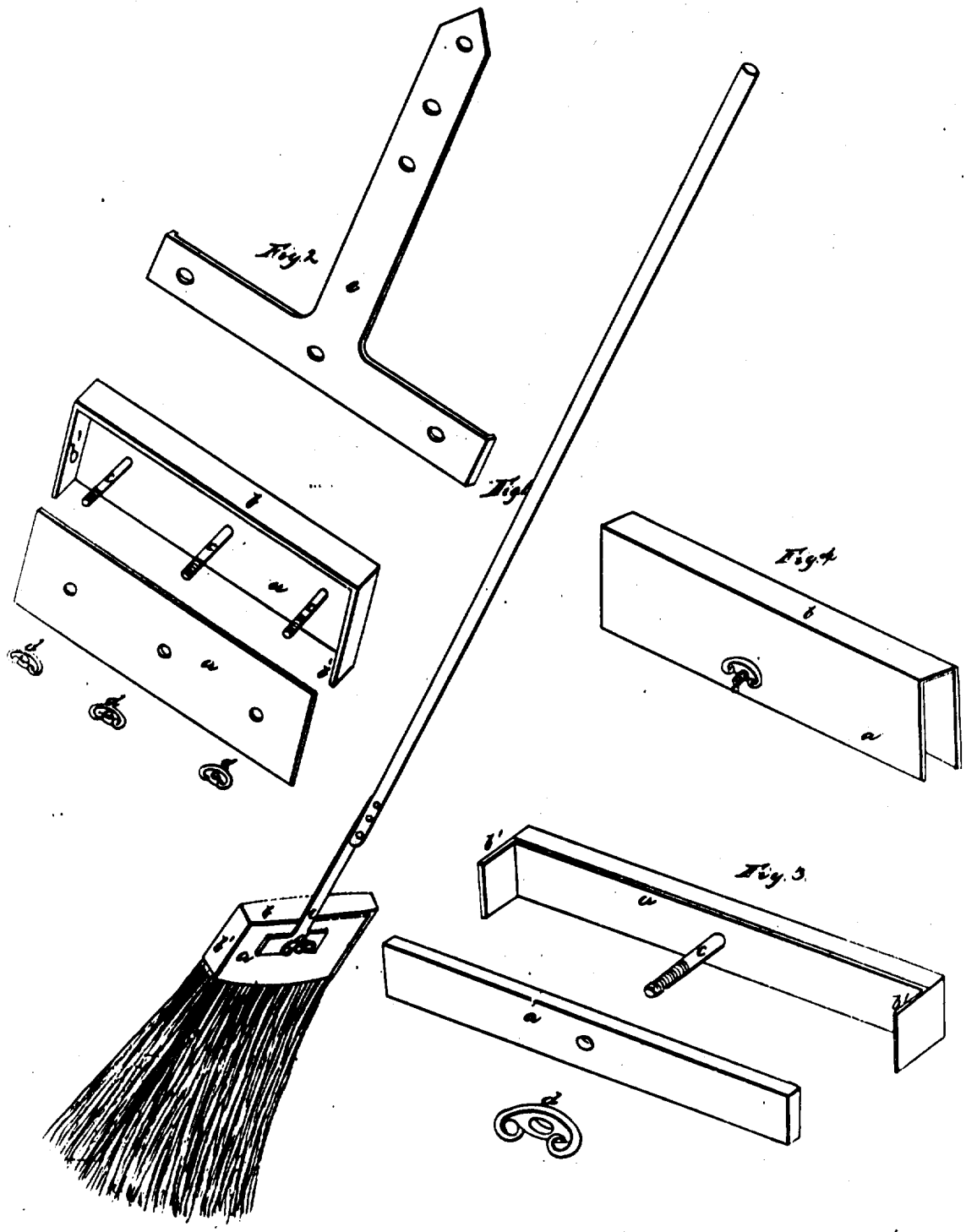
R. PETERS, PHOTO-LITHOGRAPHER, WASHINGTON, D. C.

X0005371 February 16, 1829

David Wooster of China, State of N York.

Letters Patent

The schedule referred to in these Letters Patent and making part
of the same, containing a description in the words of the said
David Wooster himself of his improvement in manufacturing
Brooms or Brushes, To all persons to whom these presents shall come
David Wooster of the town of China in the County of Gene
-see, and State of New York, sends greeting.

Be it known that I the said David Wooster have in-
vented a new and useful improvement not known or used
before, in the making or manufacturing of brooms or brushes
which invention & the manner of using it is as follows. Take
two pieces of wood, hard leather, or any kind of metal, as long as
you wish to have your brush, if wood or leather, let a narrow strip
of iron run the length of one of the pieces, & turn up at each end
sufficient to embrace the thickness of the brush. From this strip
of iron, and attached to it, let there go thro the centre of the piece,
the brush, and the opposite piece, a screw sufficiently long to receive
a nut. If desirable there can be a nut & screw at each end
the one however thro the centre will answer every purpose. Let the
inside of each piece be ovaling, by which means the brush will be kept
more firmly in its place. To the bottom of the handle is fastened a steel
spring thro the lower end of which is a hole to admit the aforesaid
screw, & when it comes in contact with the upper piece, it should leng
-then, so as to form a strap of about three inches, turning down a little
at each end, so that it shall enter the piece & remain firmer
in its place, if more than one screw be used it can be lengthened
sufficiently to be fastened by each. To these may be added a cap of
leather or of metal, or the two pieces may be so constructed as to drawing made, as to form a cap. & the cap may be so constructed as to supercede the necessity of the pieces or clamps. The pieces however are preferred as they unite economy & durability with simplicity –

These form the head of the broom or brush, & it will be perceived that it can be taken apart at pleasure. Therefore when ever a broom or brush is to be made, take the materials whether corn, splints, bristles or any other substance which can be used in making or manufacturing brooms or brushes, lay them upon the under piece place thereon the upper piece & upon that place the handles, then screw on the nut or nuts, & the broom or brush is complete. –

The benefit resulting from this invention is durability economy, simplicity & in using the brooms or brushes arising from the elasticity occasioned by the spring –

In witness whereof I have hereunto subscribed my name this fourth day of December eighteen hundred and twenty eight David Worster –

Witnesses
Geo. W. Lay }
Saml. Walker }

555 [illegible]

E:? Ch.J.W.